L. SCHWITZER.
FAN STRUCTURE.
APPLICATION FILED APR. 1, 1918.
1,316,652. Patented Sept. 23, 1919.
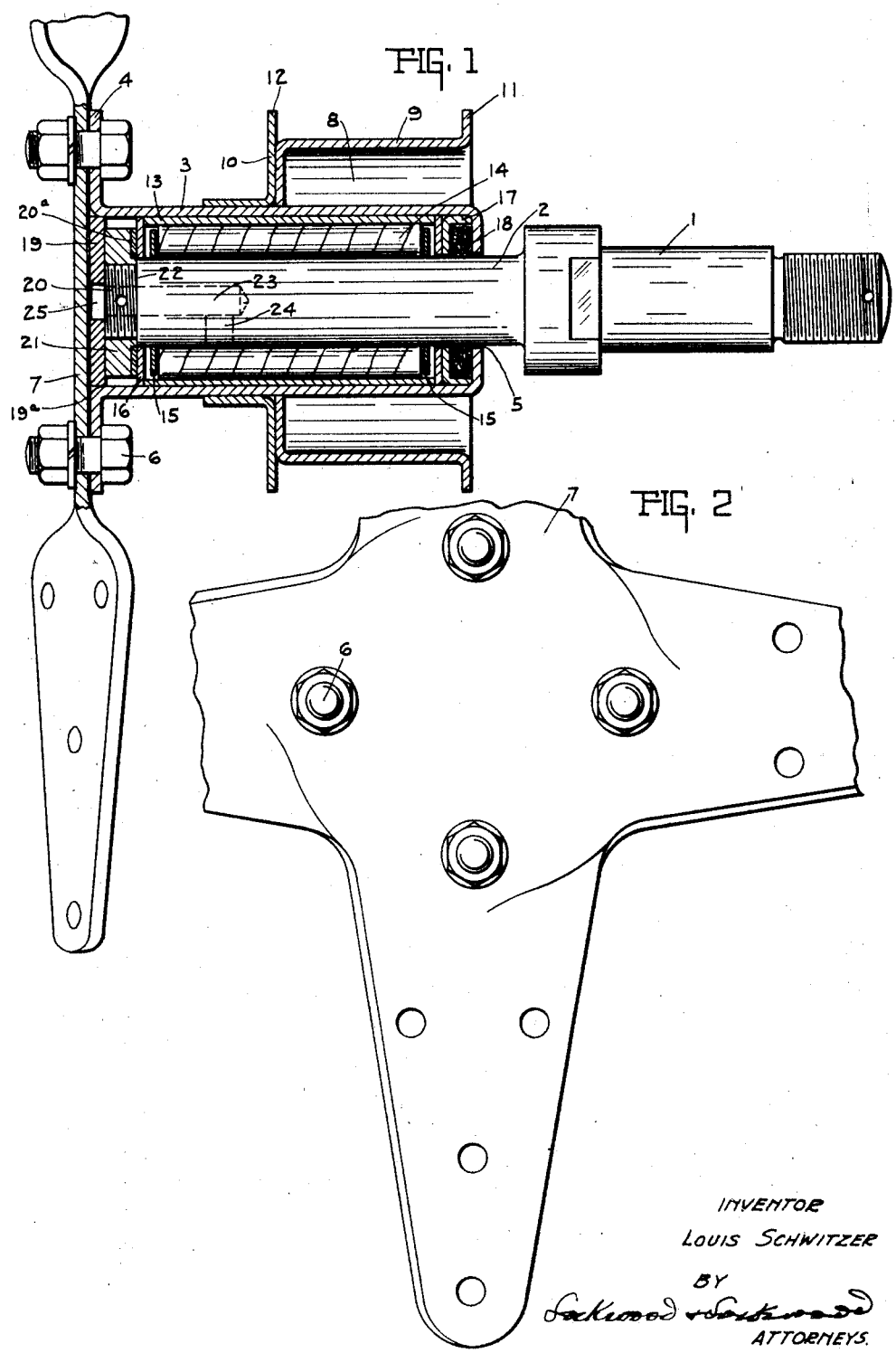
INVENTOR
LOUIS SCHWITZER
BY
ATTORNEYS.

UNITED STATES PATENT OFFICE.

LOUIS SCHWITZER, OF INDIANAPOLIS, INDIANA, ASSIGNOR TO AUTOMOTIVE PARTS CO., OF INDIANAPOLIS, INDIANA, A CORPORATION.

FAN STRUCTURE.

1,316,652. Specification of Letters Patent. Patented Sept. 23, 1919.

Application filed April 1, 1918. Serial No. 226,070.

*To all whom it may concern:*

Be it known that I, LOUIS SCHWITZER, a citizen of the United States, and a resident of Indianapolis, county of Marion and State of Indiana, have invented a certain new and useful Fan Structure; and I do hereby declare that the following is a full, clear, and exact description thereof, reference being had to the accompanying drawings, in which like numerals refer to like parts.

This invention relates to fan structures and particularly to that class used for cooling internal combustion engines, and the prime feature of the invention is in so forming the parts of the fan structure that they may be drawn from metal and readily assembled together, thereby greatly reducing the cost of manufacture and the weight of the material without detracting from the strength of the material.

A further feature of the invention is the provision of means for mounting the fan structure upon a bearing shaft. A further feature of the invention is the provision of means for distributing lubricant through the bearing portion of the fan structure and at the same time provide means for preventing leakage of the lubricant from the parts of the fan structure.

The full nature of the invention will be understood from the accompanying drawings and the following description and claims:—

Figure 1 is a detail sectional view of the fan structure showing the same mounted upon a shaft. Fig. 2 is an end elevation partly broken away, showing the manner of attaching the fan spider to the bearing parts of the fan structure.

Referring to the drawings in which similar reference numerals designate corresponding parts throughout the several views, 1 indicates a shaft to which is attached a spindle 2, said structure being such as are employed for mounting a fan upon an internal conbustion engine. The fan structure proper comprises a shell 3 which is preferably drawn from a piece of material, one end of the shell having a radiating flange 4 and the opposite end provided with an opening 5 through which the spindle 2 projects.

Attached to the flange 4 by means of bolts 6 or in any preferred manner, is a spider 7 for supporting fan blades (not shown), the body of the spider completely closing the end of the shell 3 over which the spider is positioned.

Mounted upon the exterior of the shell 3 is a driving pulley 8 which is preferably formed of sections 9 and 10, the section 9 being preferably cup shaped in cross section and provided at its open edge with a radial flange 11, while the section 10 is in the form of a flanged sleeve, the flange portion thereof extending beyond the periphery of the closed end of the section 9 to form a flange 12, the flanges 11 and 12 providing a channel for the reception of the driving belt (not shown). The sections of the pulley 8 may be secured together in any preferred manner, but the radially extending member of the section 10 is preferably spot welded to the closed end of the section 9, and the horizontal portion of the section 10 then spot welded to the section 3, thereby integrally uniting the pulley and shell.

Located within the shell 3 is a hollow sleeve 13, and between it and the spindle 2 are placed bearing rollers 14, said bearing rollers being held in position by introducing washers 15 around the spindle at the ends of the bearing rollers, and the ends of the sleeve 13 are likewise closed by means of plates 16, which latter limit the floating movement of the bearing rollers.

In order to prevent the lubricant from escaping at the inner end of the shell 3, a packing box 17, which is substantially cup shaped, is introduced into the open end of the shell 3 and around the spindle 2, and has its open end toward the closed end of the shell 3, the space within the packing box having a layer of fabric 18 therein, which absorbs any of the lubricant which might tend to leave the shell 3 around the spindle. At the opposite end of the shell 3 a gasket 19ª is placed between the flange 4 and spider 7, which prevents leakage of the lubricant between the flange and spider. Within the shell 3 and engaging the inner face of the spider 7 is a washer 19 preferably of fiber which is designed to receive a portion of the thrust from the parts of the structure and thus eliminate any metallic sounds that might occur if said washer was made of metal.

The shell 3 and parts carried thereby are held in position on the spindle 2 by providing a reduced portion 20 at the outer end of the spindle which is threaded to receive a nut 21, said nut being turned against the shoulder 22 on the spindle, and having its opposite face engaging a metallic thrust washer 20ª preferably of bronze, which is located and floats between the nut 21 and the washer 19, the nut 21 being constructed of relatively harder metal than the parts with which it engages, so that the nut will not become worn by the rotation of the fan structure.

The spindle 2 is provided with a longitudinal bore 23 and a transverse bore 24 which connects with the inner end of the bore 23 so that oil can readily circulate through the parts inclosed by the shell 3, the washer 19 having an opening 25 registering with the end of the bore 23, the openings providing additional oil space.

This device can be very cheaply constructed, and owing to the fact that the parts are drawn from material, the parts can be made much lighter, without detracting from the strength of the material. This is an important feature, as it has been found that the heavier structures of this class, which are usually cast, would cause a vibration of the fan structure when the same is being driven. This not only makes considerable noise, but soon wears out the parts and destroys the usefulness of fan belts employed for driving the fan structure by stretching the same.

By forming the parts of the fan structure of the lighter material, a more perfect balance of the parts is obtained, thus eliminating vibration and the inertia or sluggish effects on the driving mechanism, and renders the same practically noiseless.

The invention claimed is:—

1. The combination with a fan structure and a shell therefor, of a pulley secured on said shell comprising a substantially cup-shaped member in cross section, a flange extending radially outwardly from the periphery of said cup-shaped member and integral therewith, and a flanged sleeve mounted over said shell, said sleeve having a radially extending flange secured adjacent the bottom of said cup-shaped member and extending beyond the outer surface thereof so as to form a flange oppositely disposed from said first mentioned flange for forming the flanged members of said pulley.

2. In a fan structure, the combination with a hollow shell, and a spider adapted to fit over the opening thereof, of a spindle projecting through the opposite end of said shell, bearing rollers disposed around said spindle, means for retaining said bearing rollers in position on the spindle, and means for retaining the lubricant within the shell.

3. In a fan structure, the combination with a spindle, and bearing rollers disposed around the same, of a shell having an open end and a closed end, said shell incasing said bearings, a flange at the open end of the shell, a spider disposed over said open end, and attached to the flange, and means at each end of the shell for preventing leakage of the lubricant therefrom.

4. In a fan structure, the combination with a spindle, a shell for said spindle, bearing rollers surrounding said spindle, a casing retaining said bearing rollers in position, locking means adapted to be secured on the end of the spindle, and a floating thrust washer between said locking means and said casing bearing rollers for receiving the thrust therefrom.

5. In a fan structure the combination with a shell having an open end and a closed end integral therewith, said shell being adapted to receive a spindle, and bearing rollers mounted in a sleeve about said spindle, of a cup-shaped packing box adapted to be introduced in the open end of said shell and having its open end positioned adjacent the closed end thereof, the peripheral wall of said packing box lying adjacent the inner surface of said shell for spacing said sleeve from the closed end thereof, and a packing substance in said box for preventing the escape of lubricant therethrough.

In witness whereof, I have hereunto affixed my signature.

LOUIS SCHWITZER.

Copies of this patent may be obtained for five cents each, by addressing the "Commissioner of Patents, Washington, D. C."